United States Patent
Averbuch et al.

(10) Patent No.: US 8,428,328 B2
(45) Date of Patent: Apr. 23, 2013

(54) REGION-GROWING ALGORITHM

(75) Inventors: Dorian Averbuch, Ramat HaSharon (IL); Yuri Kreinin, Aurora (CA)

(73) Assignee: Superdimension, Ltd (IL)

( * ) Notice: Subject to any disclaimer, the term of this patent is extended or adjusted under 35 U.S.C. 154(b) by 234 days.

(21) Appl. No.: 13/019,261

(22) Filed: Feb. 1, 2011

(65) Prior Publication Data

US 2011/0206253 A1    Aug. 25, 2011

Related U.S. Application Data

(60) Provisional application No. 61/300,423, filed on Feb. 1, 2010.

(51) Int. Cl.
*G06K 9/00* (2006.01)
*A61B 5/08* (2006.01)

(52) U.S. Cl.
USPC .................... 382/131; 382/154; 600/532

(58) Field of Classification Search .............. 382/103, 382/106–107, 128, 129, 130, 131, 132, 133, 382/134, 154, 155, 168, 172, 173, 181, 199, 382/224, 232, 254, 276, 305, 312; 388/4, 388/21; 600/425, 415, 432
See application file for complete search history.

(56) References Cited

U.S. PATENT DOCUMENTS

| | | |
|---|---|---|
| 4,346,384 A | 8/1982 | Raab |
| 4,791,934 A | 12/1988 | Brunnett |
| 5,383,454 A | 1/1995 | Bucholz |
| 5,386,828 A | 2/1995 | Owens et al. |
| 5,402,801 A | 4/1995 | Taylor |
| 5,417,210 A | 5/1995 | Funda et al. |
| 5,425,367 A | 6/1995 | Shapiro et al. |
| 5,445,166 A | 8/1995 | Taylor |
| 5,472,441 A | 12/1995 | Edwards et al. |
| 5,480,422 A | 1/1996 | Ben-Haim |
| 5,558,091 A | 9/1996 | Acker et al. |
| 5,572,999 A | 11/1996 | Funda et al. |
| 5,600,330 A | 2/1997 | Blood |
| 5,630,431 A | 5/1997 | Taylor |
| 5,668,844 A | 9/1997 | Webber |
| 5,695,500 A | 12/1997 | Taylor et al. |
| 5,704,361 A | 1/1998 | Seward et al. |

(Continued)

FOREIGN PATENT DOCUMENTS

| | | |
|---|---|---|
| WO | 9605768 A1 | 2/1996 |
| WO | 9625882 A1 | 8/1996 |

OTHER PUBLICATIONS

WIPO, U.S. International Search Authority, International Search Report and Written Opinion mailed Sep. 24, 2009 in International Patent Application No. PCT/IL2009/000569, 7 pages.

(Continued)

*Primary Examiner* — Seyed Azarian
(74) *Attorney, Agent, or Firm* — Carter DeLuca Farrell & Schmidt LLP

(57) ABSTRACT

A technique for automatically generating a virtual model of a branched structure using as an input a plurality of images taken of the branched structure. The technique employs an algorithm that avoids inaccuracies associated with sub-optimal threshold settings by "patching" holes or leaks created due to the inherent inconsistencies with imaging technology. By "patching" the holes, the algorithm may continue to run using a more sensitive threshold value than was previously possible.

7 Claims, 1 Drawing Sheet

U.S. PATENT DOCUMENTS

| | | |
|---|---|---|
| 5,729,129 A | 3/1998 | Acker |
| 5,730,129 A | 3/1998 | Darrow et al. |
| 5,738,096 A | 4/1998 | Ben-Haim |
| 5,740,802 A | 4/1998 | Nafis et al. |
| 5,749,362 A | 5/1998 | Funda et al. |
| 5,752,513 A | 5/1998 | Acker et al. |
| 5,772,594 A | 6/1998 | Barrick |
| 5,797,849 A | 8/1998 | Vesely et al. |
| 5,800,352 A | 9/1998 | Ferre et al. |
| 5,810,007 A | 9/1998 | Holupka et al. |
| 5,829,444 A | 11/1998 | Ferre et al. |
| 5,840,025 A | 11/1998 | Ben-Haim |
| 5,871,445 A | 2/1999 | Bucholz |
| 5,873,822 A | 2/1999 | Ferre et al. |
| 5,891,034 A | 4/1999 | Bucholz |
| 5,902,239 A | 5/1999 | Buurman |
| 5,913,820 A | 6/1999 | Bladen et al. |
| 5,919,188 A | 7/1999 | Shearon et al. |
| 5,928,248 A | 7/1999 | Acker |
| 5,944,023 A | 8/1999 | Johnson et al. |
| 5,976,127 A | 11/1999 | Lax |
| 6,016,439 A | 1/2000 | Acker |
| 6,019,724 A | 2/2000 | Gronningsaeter et al. |
| 6,032,675 A | 3/2000 | Rubinsky |
| 6,073,043 A | 6/2000 | Schneider |
| 6,077,257 A | 6/2000 | Edwards et al. |
| 6,115,626 A | 9/2000 | Whayne et al. |
| 6,147,480 A | 11/2000 | Osadchy et al. |
| 6,149,592 A | 11/2000 | Yanof et al. |
| 6,161,032 A | 12/2000 | Acker |
| 6,188,355 B1 | 2/2001 | Gilboa |
| 6,201,387 B1 | 3/2001 | Govari |
| 6,203,493 B1 | 3/2001 | Ben-Haim |
| 6,211,666 B1 | 4/2001 | Acker |
| 6,226,543 B1 | 5/2001 | Gilboa et al. |
| 6,233,476 B1 | 5/2001 | Strommer et al. |
| 6,236,875 B1 | 5/2001 | Bucholz et al. |
| 6,289,235 B1 | 9/2001 | Webber et al. |
| 6,314,310 B1 | 11/2001 | Ben-Haim et al. |
| 6,331,116 B1 | 12/2001 | Kaufman et al. |
| 6,332,089 B1 | 12/2001 | Acker et al. |
| 6,335,617 B1 | 1/2002 | Osadchy et al. |
| 6,366,799 B1 | 4/2002 | Acker et al. |
| 6,373,240 B1 | 4/2002 | Govari |
| 6,405,072 B1 | 6/2002 | Cosman |
| 6,427,314 B1 | 8/2002 | Acker |
| 6,453,190 B1 | 9/2002 | Acker et al. |
| 6,484,118 B1 | 11/2002 | Govari |
| 6,556,696 B1 | 4/2003 | Summers et al. |
| 6,558,333 B2 | 5/2003 | Gilboa et al. |
| 6,574,498 B1 | 6/2003 | Gilboa |
| 6,580,938 B1 | 6/2003 | Acker |
| 6,591,129 B1 | 7/2003 | Ben-Haim et al. |
| 6,593,884 B1 | 7/2003 | Gilboa et al. |
| 6,615,155 B2 | 9/2003 | Gilboa |
| 6,618,612 B1 | 9/2003 | Acker et al. |
| 6,650,927 B1 | 11/2003 | Keidar |
| 6,690,816 B2 | 2/2004 | Aylward et al. |
| 6,690,963 B2 | 2/2004 | Ben-Haim et al. |
| 6,702,780 B1 | 3/2004 | Gilboa et al. |
| 6,706,041 B1 | 3/2004 | Costantino |
| 6,711,429 B1 | 3/2004 | Gilboa et al. |
| 6,788,967 B2 | 9/2004 | Ben-Haim et al. |
| 6,833,814 B2 | 12/2004 | Gilboa et al. |
| 6,947,788 B2 | 9/2005 | Gilboa et al. |
| 6,995,729 B2 | 2/2006 | Govari et al. |
| 6,996,430 B1 | 2/2006 | Gilboa et al. |
| 7,176,936 B2 | 2/2007 | Sauer et al. |
| 7,197,354 B2 | 3/2007 | Sobe |
| 7,233,820 B2 | 6/2007 | Gilboa |
| 7,236,567 B2 | 6/2007 | Sandkamp et al. |
| 7,286,868 B2 | 10/2007 | Govari |
| 7,301,332 B2 | 11/2007 | Govari et al. |
| 7,321,228 B2 | 1/2008 | Govari |
| 7,324,915 B2 | 1/2008 | Altmann et al. |
| 7,343,195 B2 | 3/2008 | Strommer et al. |
| 7,353,125 B2 | 4/2008 | Nieminen et al. |
| 7,366,562 B2 | 4/2008 | Dukesherer et al. |
| 7,370,656 B2 | 5/2008 | Gleich et al. |
| 7,373,271 B1 | 5/2008 | Schneider |
| 7,386,339 B2 | 6/2008 | Strommer et al. |
| 7,397,364 B2 | 7/2008 | Govari |
| 7,517,318 B2 | 4/2009 | Altmann et al. |
| 7,822,461 B2 * | 10/2010 | Geiger et al. ............... 600/415 |
| 7,831,076 B2 | 11/2010 | Altmann et al. |
| 8,165,385 B2 * | 4/2012 | Reeves et al. ............... 382/154 |
| 8,218,847 B2 | 7/2012 | Averbuch et al. |
| 8,218,848 B2 * | 7/2012 | Lenglet et al. ............... 382/131 |
| 2001/0031919 A1 | 10/2001 | Strommer et al. |
| 2002/0022837 A1 | 2/2002 | Mazzocchi et al. |
| 2002/0065461 A1 | 5/2002 | Cosman |
| 2002/0082498 A1 | 6/2002 | Wendt et al. |
| 2002/0193686 A1 | 12/2002 | Gilboa |
| 2003/0074011 A1 | 4/2003 | Gilboa et al. |
| 2003/0099390 A1 | 5/2003 | Zeng et al. |
| 2003/0144658 A1 | 7/2003 | Schwartz et al. |
| 2003/0216639 A1 | 11/2003 | Gilboa et al. |
| 2004/0006268 A1 | 1/2004 | Gilboa et al. |
| 2004/0019350 A1 | 1/2004 | O'Brien et al. |
| 2004/0097804 A1 | 5/2004 | Sobe |
| 2004/0138548 A1 | 7/2004 | Strommer et al. |
| 2004/0215181 A1 | 10/2004 | Christopherson et al. |
| 2004/0249267 A1 | 12/2004 | Gilboa |
| 2004/0254454 A1 | 12/2004 | Kockro |
| 2005/0033149 A1 | 2/2005 | Strommer et al. |
| 2005/0090818 A1 | 4/2005 | Pike et al. |
| 2005/0107688 A1 | 5/2005 | Strommer |
| 2005/0182295 A1 | 8/2005 | Soper et al. |
| 2005/0197566 A1 | 9/2005 | Strommer et al. |
| 2006/0058647 A1 | 3/2006 | Strommer et al. |
| 2006/0064006 A1 | 3/2006 | Strommer et al. |
| 2007/0167738 A1 | 7/2007 | Timinger et al. |
| 2007/0167743 A1 | 7/2007 | Honda et al. |
| 2007/0167806 A1 | 7/2007 | Wood et al. |
| 2007/0232896 A1 | 10/2007 | Gilboa et al. |
| 2007/0287901 A1 | 12/2007 | Strommer et al. |
| 2008/0008367 A1 | 1/2008 | Franaszek et al. |
| 2008/0033452 A1 | 2/2008 | Vetter et al. |
| 2008/0086051 A1 | 4/2008 | Voegele |
| 2008/0097187 A1 | 4/2008 | Gielen et al. |
| 2008/0118135 A1 | 5/2008 | Averbuch et al. |
| 2008/0132909 A1 | 6/2008 | Jascob et al. |
| 2008/0132911 A1 | 6/2008 | Sobe |
| 2008/0139915 A1 | 6/2008 | Dolan et al. |
| 2008/0147000 A1 | 6/2008 | Seibel et al. |
| 2008/0157755 A1 | 7/2008 | Kruger et al. |
| 2008/0161682 A1 | 7/2008 | Kendrick et al. |
| 2008/0162074 A1 | 7/2008 | Schneider |
| 2008/0183071 A1 | 7/2008 | Strommer et al. |
| 2008/0183073 A1 * | 7/2008 | Higgins et al. ............... 600/425 |
| 2008/0188749 A1 | 8/2008 | Rasche et al. |
| 2008/0247622 A1 | 10/2008 | Aylward et al. |
| 2009/0182224 A1 | 7/2009 | Shmarak et al. |
| 2010/0016658 A1 | 1/2010 | Zou et al. |
| 2010/0063410 A1 * | 3/2010 | Avila ............... 600/532 |

OTHER PUBLICATIONS

WIPO, U.S. International Search Authority, International Search Report and Written Opinion mailed Nov. 13, 2008 in International Patent Application No. PCT/IB07/04567, 8 pages.

WIPO, U.S. International Search Authority, International Search Report and Written Opinion mailed Oct. 26, 2009 in International Patent Application No. PCT/IB2009/005609, 11 pages.

WIPO, International Search Report mailed Mar. 31, 2000 in International Patent Application No. PCT/US99/26826, 1 page.

WIPO, International Search Report mailed Aug. 14, 2001 in International Patent Application No. PCT/IL01/00224, 3 pages.

Palagyi et al., "Quantitative analysis of pulmonary airway tree structures", Computers in Biology and Medicine 36 (2006), pp. 974-996.

WIPO, U.S. International Search Authority, International Search Report and Written Opinion mailed Jul. 12, 2011 in International Patent Application No. PCT/IB11/00243, 7 pages.

* cited by examiner

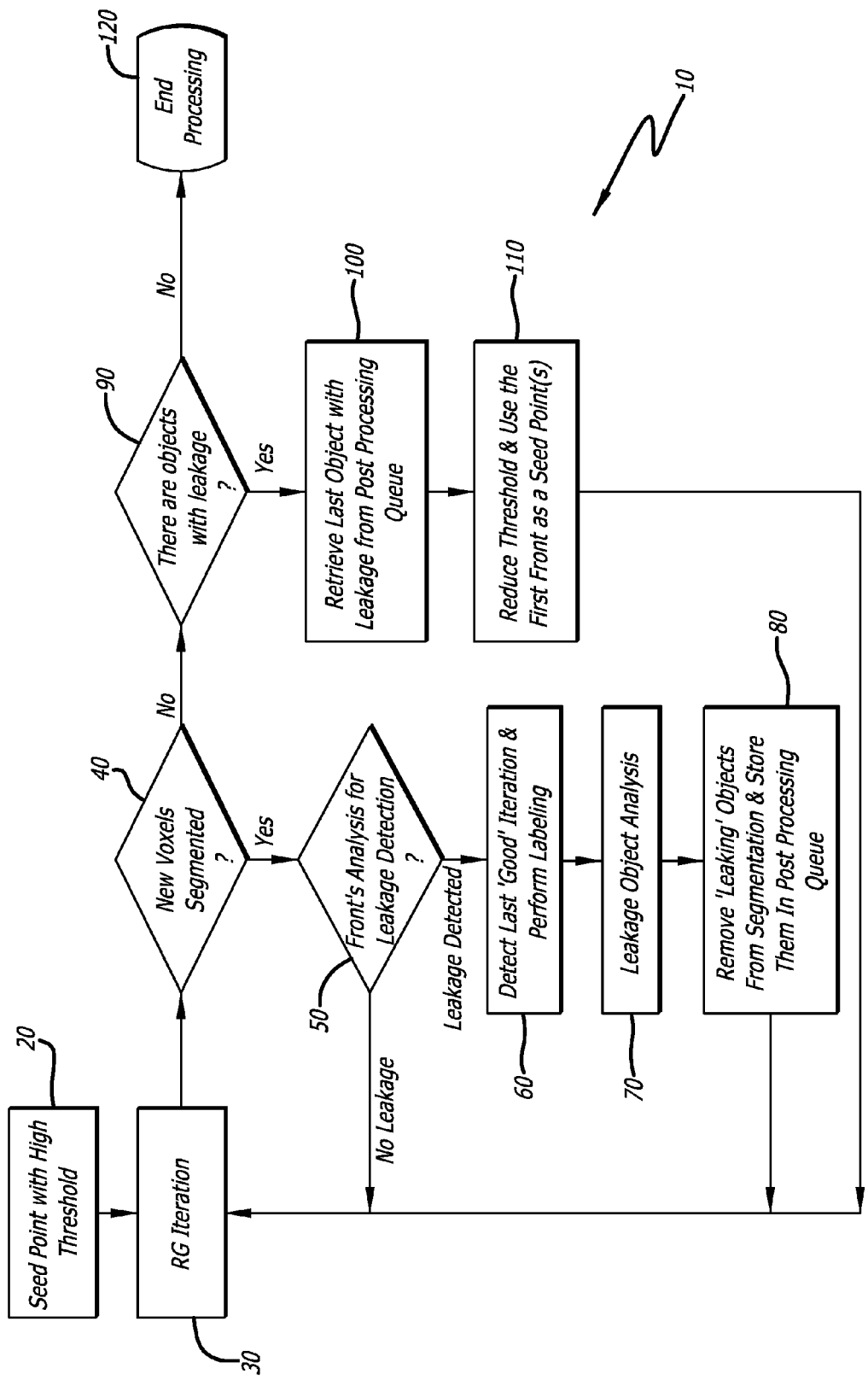

REGION-GROWING ALGORITHM

RELATED APPLICATIONS

This application claims priority to U.S. Provisional Application Ser. No. 61/300,423 filed Feb. 1, 2010 entitled Region-Growing Algorithm, which is hereby incorporated herein by reference in its entirety.

BACKGROUND OF THE INVENTION

Navigating the airways of the lungs has always presented challenges to physicians attempting to diagnose and treat lesions trans-luminally. As such, numerous navigational aids and imaging tools have been developed and/or utilized to provide physicians a "map" of the lungs.

One such tool is a CT scanner. CT scanners use X-ray technology to take multiple scans or "slices" of the lungs. These scans each represent a cross-section of the lungs and can be viewed individually or assembled, via computer programs, to form a three-dimensional CT model. However, CT scans, like most images using X-ray technology, are somewhat cloudy and translucent in nature and difficult to view. As such, computer graphics techniques are employed to interpret the information provided by the CT model and "grow" a virtual model of the airways which mimics what might be seen by a bronchoscope navigating the airways. An example of this process is shown and described in U.S. patent application Ser. No. 11/939,537, entitled Adaptive Navigation Technique For Navigating A Catheter Through A Body Channel Or Cavity, the entirety of which is incorporated by reference herein.

This graphical technique is sometimes referred to as "region growing or 3D map generation," and presents its own challenges. For example, region growing typically involves a processing of the CT data by analyzing each two-dimensional pixel, or, more pertinently, three-dimensional voxel, for brightness or "density" and assigning the voxel a value that indicates either tissue or air based on whether the density meets a certain threshold value. CT scans are grayscale images composed of a plurality of pixels (2D) or voxels (3D—if the scans have been assembled into a volume), each pixel or voxel varying in intensity from white (most intense) to black (least intense). Each intensity level between white and black appears as a shade of gray. By designating the various shades of gray from the CT scans either "tissue" or "air" the resulting image of the lungs becomes much more clear. However, if the voxels are designated incorrectly, the model of the lungs becomes inaccurate. Incorrect voxel designation results from setting the threshold level at an incorrect value, which is an inherent problem when attempting to assign discreet values (air or tissue) to voxels which are actually various shades of gray.

A presently-used technique for optimal threshold setting is beginning with a conservative threshold and performing a region-growing iteration. A conservative threshold is one that is not likely to result in leakage, which occurs when tissue is designated as air and creates a virtual image of the airways that looks like air (color) is spilling out of the airways. However, even with a conservative threshold, inaccuracies in the CT scans can result in "holes" after the segmentation process. These holes result in false branches.

Moreover, a conservative threshold results in airways that end prematurely. Therefore, after a conservative iteration is performed, resulting in a stunted branched structure, the threshold is incrementally increased and a second iteration is performed. These steps are repeated until leakage occurs. Thus, the maximum threshold that does not result in leakage is determined and used. This approach, however, naturally results in the least-dense portion of the CT image dictating the threshold level. There are other problems that arise from this method as well.

For example, during a full inhalation, the airways stretch and thin in order to accommodate the additional air volume. The thinning of the airways results in reduced tissue imaging density, and leakage thus arises even at lower threshold values.

Another example is that each time the threshold is increased, the algorithm runs from the initial seed point. Hence, if the threshold is increased ten times before leakage arises, each of the voxels analyzed in the initial iteration, is analyzed nine more times. This algorithm is thus inherently taxing on processing resources.

As such, a need is identified for a region-growing algorithm that is able to identify localized weaknesses in image data and "repair" them such that more distal branches of a bronchial tree can be segmented and "grown".

SUMMARY OF THE INVENTION

The present invention provides a technique and algorithm for controlling leakage while using a high threshold during a region growing procedure. Rather than beginning with a conservative (low) threshold, a high threshold is used but growing is analyzed and controlled.

One aspect of the present invention uses an algorithm that defines iteration as a single voxel layer of growth, rather than growth until leakage is detected. Each of the iterations is analyzed for a predicted increase (e.g., parabolic increase) in the number of voxels. If the voxels are not growing according to an expected rate, the unexpected increase is identified as leakage.

Rather than ending the region-growing process when leakage is detected, the point of leakage is isolated or "patched" so that further iterations on the current path do not continue from that point, but the rest of the model is allowed continued growth.

Another aspect of the present invention provides a post-iteration step which, in effect, repairs or salvages branches encountering leakage. After all of the iterations are performed, branches that had leakage are retrieved from a stored location and regrown with a reduced threshold. These branches are then added to the model.

The advantages of the algorithm of the present invention are numerous. One advantage is a more meaningful increase in the number of branches as a result of the utilization of the highest possible threshold.

Another advantage of the present invention is that the appearance of "holes" in the central segmented area of the model is greatly reduced.

Yet another advantage of the present invention is a reduced number of false branches. Because each iteration is analyzed, growth is controlled and false branches are prevented from growing.

Another advantage of the present invention is that the branches grown have an increased length, due to an optimized threshold as well as secondary growing efforts.

Still another advantage of the present invention is reduced importance on initial threshold value selection. Through experimentation, it has been found that this algorithm is self-correcting, yielding virtually identical results regardless of the initial threshold used, so long as the thresholds are relatively high.

BRIEF DESCRIPTION OF THE DRAWINGS

FIG. 1 is a flow-chart of a preferred embodiment of an algorithm of the present invention.

DETAILED DESCRIPTION OF THE INVENTION

The technique 10 of the present invention is charted in the flowchart presented as FIG. 1. The technique 10 begins at 20 by selecting a starting point for the segmentation of the CT data. For example, selecting a point in the trachea is a logical starting point as it is the largest, and most proximal airway, and easily recognizable on a CT scan. Preferably, the starting point is a single voxel inside the trachea that is centered and meets a high threshold value. In other words, a voxel which is clearly air is selected. Any point from which further adjacent voxels are analyzed is hereinafter referred to as a "seed point". The starting point is the first seed point.

At 30 the propagation process is initiated by designating adjacent voxels around the starting point. This designation is known as segmentation, and it indicates that the new voxels met the threshold level for air. Because the starting point is preferably selected in the trachea, and it is not desired to grow the airway back toward the mouth of the patient, only voxels in a distal direction of the starting point are segmented. As such, a "wave" is generated that travels distally into the airways. It is understood that the branches of the lungs fan out in all directions. As such, "distal direction" as used herein is interpreted as getting further away from the starting point along a path that remains in the airway. In other words, some "distal" points in the airways may be relatively close to the starting point if one were to cut through tissue to make a straight line between the points.

It is understood that the starting point, being a single voxel, is surrounded by 26 adjacent voxels, 17 of which are extending in a direction of desired growth (in a direction not yet segmented and not in a reverse direction, such as toward the mouth).

At 40, it is determined whether any new voxels were segmented. In other words, if no voxels in that "wave" met the threshold level for air, there is no growth and the tree is complete.

If the answer at 40 is "yes", the algorithm continues to 50, where the segmented voxels are counted and analyzed to determine whether there is leakage. The new voxels may be more numerous than the previous iteration, but the growth should be controlled. In other words, if the increase in the number of voxels is expected (more specifically, a parabolic increase has been observed in normal growth patterns without leakage) then it is determined that there is no leakage and the process returns to step 30 to begin a new iteration. For example, as indicated above, the starting point consisted of one voxel. Assuming the starting point was surrounded by air, the next "wave" of voxels would be seventeen new seedpoints. However, because many of these are adjacent to each other, the next successive wave would not give rise to seventeen new seed points for each of the previous seventeen seed points. Additionally, the voxels behind each seed point that have been already analyzed, are not segmented again. If the airway being segemented were perfectly cylindrical, as soon as the seedpoints reached the walls of the airway, the "wavefront" would be a convex sheet, a single voxel in thickness, and would remain constant. Hence, the mathematical model for growing is somewhat parabolic, except when new branches are introduced, and considering that the airways are narrowing in the distal direction. Leakage, however, results in an abrupt increase in the number of segmented voxels.

If at 50 the analysis results in an unexpected or abnormally high increase in segmented voxels, it is determined that leakage exists and the process moves to step 60, which identifies and records the segmented voxels from the previous iteration and labels them as accurate.

Leakage determination is derived from two important conclusions: (1) It is expected that the front size has an inverse (not necessarily linear) dependence on the iteration number, e.g. [front size]~f(1/iteration number). (2) Bifurcations and changes in airway shape may result in somewhat linear growth in front size.

At 70, upon the detection of leakage, an analysis is done in order to select the most recent "good" iteration that does not contain leakage. This decision is based on the same principals used to satisfy the mathematical model in compliance with the natural structure of the bronchial tree.

The voxels segmented up to the last good iteration are assumed to be committed to the segmented voxel list, while voxels that belong to each iteration above the "good" one are analyzed in order to separate the voxels that led to the leakage. In order to make this analysis, recently segmented voxels are labeled to connected objects (part of the branch). Each object is then analyzed in order to detect the object that caused leakage.

The coordinates of voxels that belong to inaccurate objects are stored separately and treated differently thereafter. They are locked in the binary map to prevent their participation in the segmentation process. Voxels, belonging to accurate branches are returned to the sementation and the process returns to 30.

At 80 the objects identified as leaking are removed from further segmentation and stored in a queue for post processing. After 80 the process returns to 30 for the next iteration.

If at 50 the answer was "no" for leakage, the process returns to 30 for the next iteration. It should be noted that the flow chart 10, though presented in series for clarification, is actually a parallel operation. In other words, each new voxel is a seed point and the flow chart is performed on each next iteration therefrom simultaneously. Hence, viewing the growth of the bronchial tree real time, one would see a near-instant tree appear, depending of course on the power of the processor running the algorithm.

If at 40 there are no new voxels detected, the algorithm proceeds to 90, which is a decision step asking whether any leakage objects were identified. If the answer is "yes" step 100 is executed, which retrieves the last object from the storage queue (step 80).

Next at 110, the threshold is reduced and the algorithm is performed on only the selected leakage object. Because a reduced threshold is being used, the likelihood of leakage is reduced.

If at 90 it is determined that there are no leakage objects, either because there were none or they have all been reprocessed, the process is completed at 120.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

We claim:

1. A method for creating a virtual model of an anatomical structure from a three-dimensional image volume, comprising:

providing a three-dimensional image volume created from a plurality of two-dimensional images;

setting a threshold value, above which is indicative that an imaged voxel is not representing tissue;

selecting a seed point voxel in said three-dimensional image volume as a starting point;

performing a plurality of iterations, each iteration comprising:

segmenting voxels, immediately adjacent said seed point in all desired directions, that meet or exceed said threshold value;

determining a number of voxels segmented in this iteration;

if said number of voxels is greater than zero, determining whether said number is large enough to indicate leakage;

removing leaked voxels and storing them as leaked objects for post-processing identifying segmented voxels as seed points for next iteration if no leakage is indicated;

detecting when said number of voxels segmented equals zero;

performing secondary iterations on leaked objects, if any, until said number of voxels segmented equals zero, said secondary iterations comprising:

selecting voxels in a first iteration detecting leakage for a given leaked object as seed points;

reducing said threshold value;

segmenting voxels, immediately adjacent said seed points in all desired directions, that meet or exceed said threshold value;

determining a number of voxels segmented in this iteration;

if said number of voxels is greater than zero, determining whether said number is large enough to indicate leakage;

removing leaked voxels and storing them as leaked objects for post-processing identifying segmented voxels as seed points for next iteration if no leakage is indicated.

2. The method of claim 1 wherein selecting a seed point voxel in said three-dimensional image volume as a starting point comprises selecting a seed point voxel having a high threshold.

3. The method of claim 2 wherein selecting a seed point voxel having a high threshold comprises selecting a seed point voxel having a threshold indicative of air.

4. A computer readable medium storing instructions that when read by a computer perform a method for creating a virtual model of an anatomical structure from a three-dimensional image volume, comprising:

using as a threshold, an image voxel density indicative of a fluid;

segmenting only voxels meeting said threshold, thereby creating a virtual model of interior cavities and/or lumens of said anatomical structure, wherein the segmenting is performed as a series of iterations using a segmented voxel as a seed point and analyzing unsegmented voxels adjacent said seed point in a desired direction; and repeating said iterations using newly segmented voxels from an iteration as seed points for a next iteration until no unsegmented voxels adjacent said seed points in said desired direction remain.

5. The method of claim 4 further comprising:

separating from said segmenting step, voxels meeting said threshold but forming objects, identified as leaked objects, that fail to meet criteria based on comporting to known anatomical structure.

6. The method of claim 5 further comprising:

resegmenting said leaked objects using a reduced threshold;

separating from said resegmenting step, voxels meeting said reduced threshold but forming objects, identified as leaked objects, that fail to meet criteria based on comporting to known anatomical structure;

adding resegmented voxels, not separated, to said virtual model.

7. The method of claim 6 comprising:

performing said resegmenting step as a series of iterations using a set of first-segmented voxels identified as part of a leaked object as seed points and analyzing unsegmented voxels adjacent said seed points in a desired direction;

repeating said iterations using newly segmented voxels from an iteration as seed points for a next iteration until no unsegmented voxels adjacent said seed points in said desired direction remain.

* * * * *